Dec. 29, 1964   P. R. RUNNING ETAL   3,163,409
TORSION BAR SEAT SUSPENSION
Filed Aug. 25, 1961

INVENTORS
Peter R. Running
Charles Whitney Buddo
Popp and Sommer
Attorneys

United States Patent Office 3,163,409
Patented Dec. 29, 1964

3,163,409
TORSION BAR SEAT SUSPENSION
Peter R. Running, 15 Ward Road, North Tonawanda, N.Y., and Charles Whitney Buddo, 2 Blythdale Road, Toronto 2, Ontario, Canada
Filed Aug. 25, 1961, Ser. No. 133,999
8 Claims. (Cl. 267—1)

This invention relates to a spring suspension for the seats of vehicles and more particularly to such a seat suspension which involves the use of torsion bars to support the seat and provide a comfortable low frequency ride for the operator and passengers of small water craft even during rough weather while travelling at high speeds where the craft is thrown around with considerable violence. The seat suspension of the present invention is not restricted, of course, to any particular use.

It is accordingly a principal object of the present invention to provide a spring suspension for the seats of vehicles such as small motor boats which will support the occupant comfortably and leave him in full control of the boat at all times, even under heavy weather conditions where the boat is subjected to violent action.

Another object is to provide such a spring suspension for vehicle seats which provides the comfort of a low frequency constant rate spring support.

Another important object is to provide such a spring suspension which eliminates pitching and lurching of the seat and occupant even under adverse ride conditions.

A further object of the invention is to provide such a vehicle seat suspension in which the low frequency constant rate spring support is obtained through the use of low cost torsion rods which can be made, however, of high quality torsion steel and provided with a baked epoxy resin finish to withstand all climatic conditions.

Another object is to provide such a seat which can be tilted so as to protect the cushions from the sun, rain, dew and dirt.

Another object is to provide such a seat suspension which, when tilted to an inoperative position, tends to yieldingly hold itself in such tilted position, the spring bars of the suspension distorting to bind slightly in their bearings when the seat is so tilted.

Another object is to provide such a seat suspension for boats or the like which occupies a minimum of space at the bottom of the boat and which can be moved to permit of easy cleaning of both the boat and the seats.

Another object of the invention is to provide such a seat for vehicles such as a boat, which has a greatly reduced impact strain upon the chassis or the hull of the boat and is particularly adapted for use in conjunction with all fiberglass hulls which have considerable flexibility in use and in which it is undesirable to have concentrated stresses.

Another important object is to provide a seat which can be readily adjusted to support persons of different weight, or different numbers of persons at the same elevation.

Another important object of the invention is to provide such a suspension which can be readily removed, together with the seat frame and its cushions, from the hull.

Another important object is to provide such a suspension which is very low in cost, attractive in appearance and which will stand up under conditions of severe and constant use without getting out of order or requiring repairs.

Other objects and advantages of the invention will be apparent from the following description and drawings in which.

Figure 1:
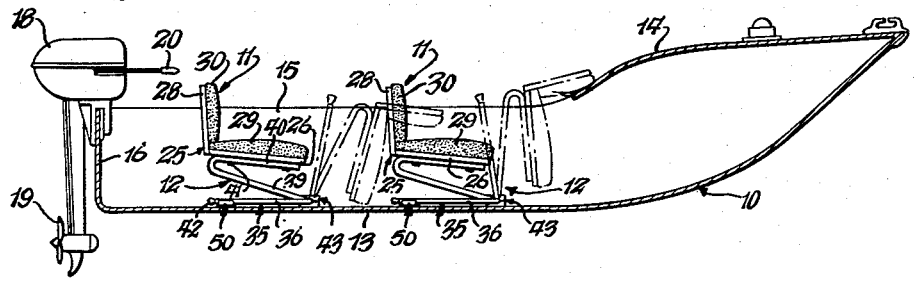
FIG. 1 is a longitudinal section through the fiberglass hull of an outboard motor boat equipped with a pair of double occupancy seats each having a spring suspension made in accordance with the present invention. This view also shows in dot-dash lines the manner in which the seats can be tilted to an inverted position to protect them from sun, rain, dew and dirt.

While a feature of the torsion bar suspension embodying the present invention is its applicability to a wide variety of vehicles, particularly rough riding vehicles, the invention is shown in conjunction with the hull 10 of an outboard motor boat having a pair of double occupancy seats 11 arranged in fore-and-aft relation to each other and each supported by a torsion bar spring suspension, indicated generally at 12, embodying the present invention. The hull 10 is shown as made of fiberglass and resin molded to provide a bottom 13, a forward deck 14, and sides 15 connected at their rear ends by a transom 16. This transom is shown as supporting a conventional outboard motor 18 clamped thereon and propelling the boat through a submerged propeller 19. The controls for the outboard motor 18, such as the steering arm 20, are shown as being within convenient reach of the occupants of the stern seat 11 and it is a feature of the invention that even under adverse weather conditions and when travelling at high speed the occupant of this stern seat is resiliently supported free from lurching and pitching by the seat so as to be in full control of the outboard motor 18 at all times.

Each seat 11 is shown as comprising a rigid frame indicated generally at 25 constructed to have a seat frame shown as being in the form of a wooden panel 26 and a rigidly connected back frame shown as being in the form of a wooden panel 28. The seat frame or panel 26 is shown as supporting a seat cushion 29 of any suitable construction fixed thereto and which is shown as being a double occupancy seat cushion. The back frame or panel 28 is shown as having a back cushion 30 fixed thereto.

The torsion spring suspension of the present invention includes a single solid bar 35 of spring metal, preferably of high quality spring steel, supporting at least one side of the seat frame 25, these bars 35 being provided in counterpart pairs to support the opposite lateral or fore-and-aft sides of the seat frame 26. Each of these bars 35 is formed to provide a first arm section 36 extending along the boat bottom 13 below and in a plane generally parallel with a corresponding lateral or fore-and-aft side of the seat frame 26. Each bar 35 is also formed to provide a torsion bar section 38 forming an integral generally perpendicular continuation of one end of the first arm section 36 and arranged generally parallel and in closely spaced relation with each other and generally parallel with and below a transverse side of the seat frame 26, specifically the front side.

Each bar 35 also includes a second arm section 39 forming an integral generally perpendicular continuation of the end of each torsional bar section 38 opposite from its first arm section and arranged below and in a vertical plane generally parallel with the corresponding lateral or fore-and-aft side of the seat frame. Each second arm section 39 inclines upwardly from its torsion bar section 38 with reference to its first arm section 36. Each bar 35 is completed by a third arm section 40 forming an integral continuation of each second arm section 39 and extending lengthwise of the first arm sections 36 along the bottom of the seat frame 2 to a point adjacent the front transverse side of the seat frame 26. These third arm sections 40 can be secured to the underside of the seat frame 26 by suitable fastening members, such as screws 41, and the free ends of the first arm sections 36 can be capped, as by a rubber cap 42.

The opposite ends of the torsion bar sections 38 are jointly supported on the boat bottom 13 by brackets 43 each of which serves as a bearing for the live end of one torsion bar section 38 and as an anchor for the dead end of the other torsion bar section. These brackets also serve as bearings for both ends of these torsion bar sections when the seat is tilted to an inverted position as shown by dot-dash lines in FIG. 1. To this end each bracket 43 includes a bottom plate 44 suitably secured to the boat bottom 13 below each pair of ends of the two torsion bar sections 38 and a top plate 45 secured, as by screws 46, to each bottom plate 44 in embracing relation with the torsion bar sections. One or both of these plates can be grooved, as indicated at 48 and 49, to fit the live and dead ends of the torsion bar sections, this fit with both ends of the torsion bar section being such as to permit the required rotative movement thereof.

A feature of the invention resides in the ability to adjust the height of the occupied seat frame to correspond to the weight of the occupant, or to the number of occupants, so that any desired sitting level can be maintained. To this end a supporting block 50 is slidably mounted in a horizontal track 51 which is suitably secured to the boat bottom 13 below the outboard or rear end of each of the first arm sections 36. The tracks 51 are arranged transversely of the first arm sections 36 and are in the form of channels, the side walls 52 of which can converge upwardly to fit similarly convergent side walls 53 of the block 50. Each block 50 is provided with a plurality of notches or seats 54, 55 and 56 for the outboard end of the corresponding first arm section 36, these seats being arranged at different elevations.

With two occupants the seat frame might settle to an undesirably low level and to compensate for this and restore the seat frame to the desired elevation, the blocks 50 can be moved along the tracks 51 so as to bring a higher seat 55 or 56 under the first arms 36.

Figure 2:
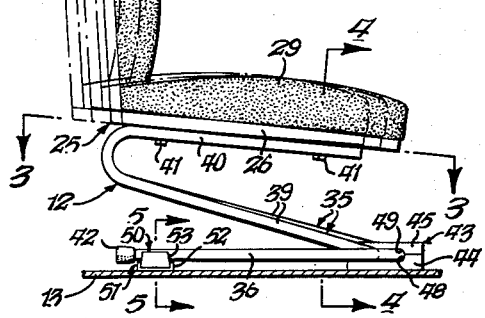
FIG. 2 is an enlarged fragmentary view similar to FIG. 1 and showing in greater detail a side elevational view of one of the seats. This view also shows in dot-dash lines, the manner in which the seat can be adjusted to provide different spring rates.
Figure 3:
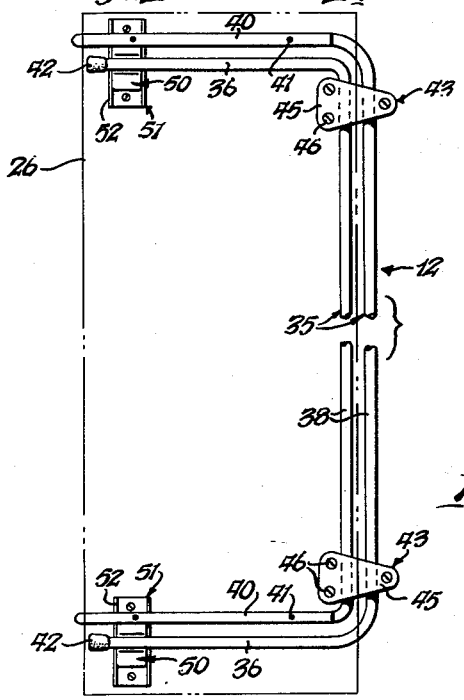
FIG. 3 is a horizontal section taken generally on line 3—3, FIG. 2.
Figure 4:
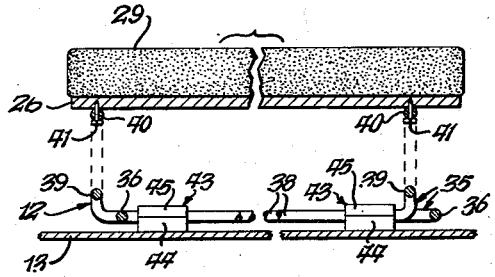
FIG. 4 is a fragmentary vertical transverse section taken generally on line 4—4, FIG. 2.
Figure 5:
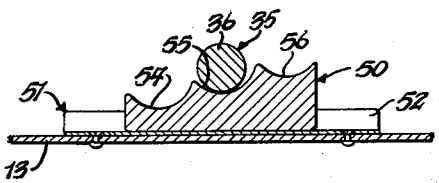
FIG. 5 is an enlarged vertical section taken on line 5—5, FIG. 2 and showing a block movable to adjust the elevation of the seat to different elevations.

In screwing the seat frame 26 to the third arm sections 40 of the bars 35, the seat frame can be positioned to obtain the desired spring rate and degree of softness. Thus, if a harder ride and higher spring rate is desired, the seat frame 26 is screwed to the third arm sections 40 so as to be in the forward full line position shown in FIG. 2. If on the other hand a softer ride with a lower spring frequency is desired, the seat frame 26 is screwed to the third arm sections 40 so as to be in one of the rearward positions illustrated by dot-dash lines in FIG. 2.

With the seat 11 adjusted as above described and occupied, upward movement of the hull 10 of the boat effects a downward swinging movement of the second arm sections 39 of the suspension for each seat, thereby to rotate the live ends of the torsion bar sections 38 in the bearing brackets 43. The opposite or dead ends of these torsion rod sections 38 are held against movement by virtue of the fact that the pressure exerted by them against the first arm sections 36 is downward and movement of these first arm sections is prevented by virtue of their resting upon the adjusting blocks 50. Accordingly the upward force of the hull (or the downward movement of the seat frame 26) is yieldingly resisted by the two torsion rod sections 38 which serve to return the seat to its normal level following the impact. Since the seat frame 26 is supported at its opposite sides by counterpart spring assemblies each seat is laterally stable and rises and falls in a substantially vertical path free from pitching or lurching. At the same time the second arm sections 39 provide a slight laterally cushioned movement to the seat frame so that violent side thrusts are cushioned to a limited degree.

When the boat is not in use each chair frame 25 can easily be swung to an inverted position in which its seat and back cushions 29 and 30 are protected from sun, rain, dew and the accumulation of dirt. To do this all that is necessary is to grasp the back of the seat and swing it forwardly about the torsion bar sections 38 as pivots, both ends of these torsion bar sections turning in the bearing brackets 43 for this purpose. The seat is so turned in the bearing brackets 43 for this purpose. The seat is so turned until it assumes the inverted positions shown by dot-dash lines in FIG. 1 with portions of the seat cushions resting either on the forward deck 14 of the boat or upon its bottom 13, as shown. The fit of the torsion rod sections 38 in the bearing brackets 43 is sufficiently free to permit the chairs 11 to be so turned about two axes but it is also desirable that the metal of the spring structure 12 be stressed slightly to provide a slight bind in the bearings when the seat is completely inverted. This bind tends to held each seat frictionally in its inverted position so that the inverted seats do not bounce around when the boat is riding at anchor.

It will be seen that each block 50 forms a means connecting and holding the outboard end of each arm 36 immobile relative to the body 10 during normal use of the seat 11 and that each extension 40 of each arm 39 is connected to and held in immobile relation to the seat 11 by the screws 41.

From the foregoing it will be seen that the present invention provides a very simple and low cost spring suspension for seats particularly adapted for use in vehicles and that the suspension achieves the objects and has the many advantages previously enumerated.

What is claimed is:

1. In a vehicle having a vehicle body member, a seat member arranged above said vehicle body member, and means supporting one side part of said seat member on said body members; the combination therewith of a torsion bar suspension for resiliently supporting the opposite side part of said seat member on said body member, comprising generally horizontal torsion bar, bearing means journalling said torsion bar on one of said members along a generally horizontal axis extending sidewise with reference to said seat member, a first generally horizontal arm fixed at one end to one end of said torsion bar and extending perpendicularly therefrom, a first means connecting and holding the opposite end of said first arm in immobile relation to one of of said members during normal use of the seat member, a second arm fixed at one end to the opposite end of said torsion bar and extending generally perpendicularly therefrom in the same general direction as, but at a vertical inclination with reference to said first arm, an extension fixed to the opposite end of said second arm, and a second means connecting and holding said extension in immobile relation to the other of said members.

2. The combination set forth in claim 1 wherein said one of said members is said body member and said first connecting and holding means is in the form of a block on which said opposite end of first arm rests and having portions of different elevations, and said combination additionally including means movably positioning said block on said body member to support selectively said first arm on any of said portions of different elevation to adjust the elevation of said seat member.

3. The combination set forth in claim 2 wherein said means supporting said one side part of said seat seat member on said body member comprises a torsion bar suspension which is substantially a counterpart of said first mentioned torsion bar suspension.

4. The combination set forth in claim 3 wherein each of said torsion bar suspensions is in the form of a single length of spring metal with said arms forming integral, lateral end continuations of the corresponding torsion bar and wherein said extension of each torsion bar suspension comprises a third arm forming an integral end continuation of said opposite end of the corresponding second arm and is formed from said single length of spring metal.

5. The combination set forth in claim 3 wherein said bearing means are common to both said torsion bars.

6. The combination set forth in claim 1 wherein said torsion bar, first arm and second arm are in the form of a single length of spring metal with said arms forming integral, lateral end continuations of said torsion bar.

7. The combination set forth in claim 6 wherein said extension comprises a third arm forming an integral end continuation of said opposite end of said second arm and is formed from said single length of spring metal.

8. The combination set forth in claim 6 wherein said torsion bar is arranged under the front of said seat member and said arms project therefrom to positions under the rear of said seat member.

References Cited in the file of this patent
UNITED STATES PATENTS

| | | |
|---|---|---|
| 118,452 | Hershey | Aug. 29, 1871 |
| 2,245,809 | Olley | June 17, 1941 |
| 2,942,871 | Kraus | June 28, 1960 |

FOREIGN PATENTS

| | | |
|---|---|---|
| 598,458 | Great Britain | Feb. 18, 1948 |
| 612,475 | Great Britain | Nov. 12, 1948 |